United States Patent [19]
Sweetser et al.

[11] Patent Number: 5,804,151
[45] Date of Patent: Sep. 8, 1998

[54] PROCESS FOR AUTOCLAVING MOLYBDENUM DISULFIDE

[75] Inventors: William H. Sweetser, Tucson, Ariz.; Leonard N. Hill, Silverthorne, Colo.

[73] Assignee: Cyprus Amax Minerals Company, Englewood, Colo.

[21] Appl. No.: 931,147

[22] Filed: Sep. 16, 1997

[51] Int. Cl.$^6$ .................................................. C01G 37/14
[52] U.S. Cl. .............................. 423/58; 423/53; 423/54; 423/55; 423/593; 423/606
[58] Field of Search ................................. 423/55, 53, 58, 423/54, 606, 593

[56] References Cited

U.S. PATENT DOCUMENTS

| | | |
|---|---|---|
| 3,656,888 | 4/1972 | Barry et al. . |
| 3,714,325 | 1/1973 | Bloom et al. . |
| 3,834,894 | 9/1974 | Spedden et al. . |
| 3,957,946 | 5/1976 | Ronzio et al. ............................ 423/56 |
| 4,046,852 | 9/1977 | Vertes et al. . |
| 4,165,362 | 8/1979 | Reynolds .................... 423/53 |
| 4,221,588 | 9/1980 | Grimes .......................... 75/7 |
| 4,379,127 | 4/1983 | Bauer et al. . |
| 4,512,958 | 4/1985 | Bauer et al. . |
| 4,552,749 | 11/1985 | McHugh et al. . |
| 4,724,128 | 2/1988 | Cheresnowsky et al. . |

*Primary Examiner*—Gary P. Straub
*Assistant Examiner*—Cam N. Nguyen
*Attorney, Agent, or Firm*—Bruce E. Dahl; Klaas, Law, O'Meara & Malkin, P.C.

[57] ABSTRACT

A method for producing $MoO_3$ from $MoS_2$. $MoS_2$ is combined with water to form a slurry which is then combined with at least one oxygen-containing oxidizing gas in a reaction chamber in order to initiate oxidization and conversion of $MoS_2$ into $MoO_3$. The oxidization and conversion of $MoS_2$ into $MoO_3$ is terminated before complete conversion of $MoS_2$ to $MoO_3$ takes place in order to generate a solid reaction product comprising $MoO_3$ and unreacted $MoS_2$ in combination with a residual liquid product comprising dissolved Mo therein. The oxidization and conversion process may be terminated when about 70–95% by weight $MoS_2$ has been converted to $MoO_3$. Thereafter, the solid reaction product is separated from the residual liquid product and the residual liquid product combined with at least one extractant in order to generate a liquid fraction containing dissolved Mo. The liquid fraction containing dissolved Mo is then transferred back to the reaction chamber so that the dissolved Mo is combined with additional incoming supplies of $MoS_2$. Unreacted $MoS_2$ is removed from the solid reaction product and transferred back to the reaction chamber also for combination with additional incoming supplies of $MoS_2$.

25 Claims, 2 Drawing Sheets

PROCESS FOR AUTOCLAVING MOLYBDENUM DISULFIDE

FIELD OF INVENTION

The present invention generally relates to the processing of molybdenum and more particularly to the production of molybdenum oxide materials (e.g., molybdenum trioxide, $MoO_3$) from molybdenum sulfide (e.g., $MoS_2$).

BACKGROUND

In recent years, molybdenum has become increasingly useful for many different purposes. These purposes range from the use of molybdenum as an important strength-imparting component in metal alloys to the incorporation of molybdenum compounds in various chemical catalysts. Likewise, molybdenum compositions are highly suitable for the production of electrical contacts, electrical filaments, colloidal lubricant additives, and other diverse products. Molybdenum (at. no.: 42; at. wt.: 95.94) is primarily found in the form of molybdenite ore which contains molybdenum sulfide ($MoS_2$) and in wulfenite ($PbMoO_3$), although the processing of molybdenite ore is of primary concern as discussed further below.

Typically, molybdenite ore consists of silicified granite compositions having deposits of soft, black, and hexagonal $MoS_2$ crystalline structures widely dispersed therein (e.g., in an average concentration of only about 0.03–0.6% by weight of the entire ore body). One of the largest sources of $MoS_2$-containing ore (e.g., molybdenite as previously noted) is the Henderson molybdenum mine site operated by the Cyprus Climax Metal Company at Empire, Colo. (USA), although other mine sites throughout the world are able to produce large amounts of this material. This particular mine site is characterized as a "primary" mine which is capable of producing large amounts of relatively pure product. However, of increasing interest is "byproduct" or "secondary" molybdenite which involves a secondary product combined with copper-containing materials obtained from "non-primary" mine sites.

In view of its increasing industrial and scientific importance, substantial research activity has been devoted to the development of improved methods for the beneficiation of $MoS_2$-containing ore products (especially lower-cost "secondary" compositions). Normally, $MoS_2$ derived from molybdenite ore is converted by oxidization to various oxides of molybdenum, followed by further processing in order to obtain a purified molybdenum oxide product consisting primarily of molybdenum trioxide ($MoO_3$). The initial oxidization step in which $MoS_2$ is converted to $MoO_3$ may be accomplished in many ways, including roasting, as discussed in U.S. Pat. No. 4,046,852, and high pressure wet oxidization (i.e., autoclaving), as discussed in U.S. Pat. Nos. 4,379,127 and 4,512,958.

As indicated in the foregoing patents, the $MoS_2$ containing molybdenite ore may be initially subjected to a physical grinding process in which the ore is reduced in size to a plurality of small particles (e.g., having a typical particle size of about 100 U.S. Tyler mesh or less). The ore particles are then further treated to remove the desired $MoS_2$ therefrom. This step may be accomplished using a variety of techniques, including organic flotation extraction procedures which employ various hydrocarbon compositions and wetting agents that are known in the art for this purpose. As a result, and as is described in U.S. Pat. No. 4,046,852, the desired $MoS_2$ may be effectively separated from ore-based waste materials (conventionally known as "gangue") which consist primarily of silica-containing by-products. Specifically, the desired $MoS_2$ compositions will (by virtue of their minimal weight and density levels compared with the gangue), be readily isolated in the flotation froth. Many variations and alternatives exist in connection with the isolation of $MoS_2$ from the ore, with the selected procedure depending on the type and grade of ore to be processed. In this regard, the present invention shall not be exclusively limited to any particular ore processing methods, with many different conventional procedures being suitable for use in the claimed invention.

As was mentioned above, the isolated $MoS_2$ may be converted into the desired molybdenum oxide reaction product (primarily $MoO_3$) by a variety of oxidization methods, including but not limited to roasting, as discussed in U.S. Pat. No. 4,046,852, and high pressure wet oxidization processes (i.e., autoclaving), such as those discussed in U.S. Pat. Nos. 4,379,127 and 4,512,958, both to Bauer, et al.

For example, U.S. Pat. Nos. 4,379,127 and 4,512,958 each involve a procedure in which $MoS_2$ is converted (oxidized) into $MoO_3$ by forming a slurry or suspension of $MoS_2$ in water and thereafter heating the slurry in an autoclave. During the heating process, an oxygen atmosphere is maintained within the autoclave. As a result, $MoO_3$ is generated in accordance with the following exothermic reaction:

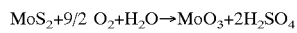

$$MoS_2 + 9/2\ O_2 + H_2O \rightarrow MoO_3 + 2H_2SO_4$$

Both of these references also discuss the recycling of various reaction products back to the initial stages of the procedure in order to adjust the density of the slurry so that proper temperature levels are maintained within the system. In U.S. Pat. No. 4,512,958, the autoclave temperature is controlled by constantly adjusting the suspension density (e.g., the ratio of water to solids). Higher density values will result in temperature increases within the autoclave. Likewise, if lower temperatures are desired, fluids can be added to reduce the suspension density.

In the process described in the '958 patent, water and $MoS_2$ are combined in a slurrying unit to generate a suspension which is then routed to the autoclave. Oxygen is subsequently added to the contents of the autoclave to produce an oxidized suspension, which is thereafter filtered to generate a solid product (e.g., $MoO_3$) and a first filtrate. The first filtrate, which contains substantial amounts of sulfuric acid ($H_2SO_4$), is subsequently treated in a precipitation reactor where it is neutralized by the addition of limestone (calcium carbonate). As a result, a suspension of calcium sulfate dihydrate (e.g., gypsum) is produced which is filtered to generate a solid gypsum product and a second filtrate. The autoclave may include a controller and associated sensor to facilitate the operation of a series of valves to control the amount of water added to the suspension within the autoclave and the amount of oxygen supplied to the autoclave. Selective water addition in this manner controls the temperature levels in the suspension. When lower temperature levels are desired, more water is added and vice versa.

The '127 patent is closely related to the '958 patent just described and discloses a method for recovering molybdenum oxide in which the suspension density and temperature are maintained at desired levels. Specifically, the levels include a density of 100–150 g of solids per liter and a temperature of 230°–245° C.

U.S. Pat. No. 3,656,888 to Barry et al., discloses a process in which $MoS_2$ starting materials are combined with water in an autoclave to produce a slurry. Pure oxygen, air, or a mixture of both is thereafter added to the autoclave in order to oxidize the $MoS_2$ and produce $MoO_3$. The resulting product is then delivered to a first filter so that the $MoO_3$ can be separated from the liquid filtrate. The liquid filtrate is then routed to a neutralizer in which an alkaline compound is added in order to precipitate dissolved $MoO_3$. The resulting $MoO_3$ is thereafter collected in a second filter. Next, the filter cake obtained from the first filter (which contains unreacted $MoS_2$) is washed with ammonium hydroxide in order to dissolve the $MoO_3$ and leave the $MoS_2$ unaffected. The undissolved materials are thereafter collected using a third filter. The dissolved $MoO_3$, (which is in the form of ammonium molybdate) is recovered by evaporation or crystallization and calcined to recover purified $MoO_3$.

The collected $MoS_2$ is then charged to a second autoclave in which the $MoS_2$ is combined with water to form a slurry. The slurry is thereafter oxidized as discussed above with an oxygen-containing gas. The oxidized slurry is subsequently filtered in a fourth filter to collect the resulting solid $MoO_3$. The liquid filtrate is transferred to a neutralizer. The filter cake obtained from the fourth filter is washed with aqueous ammonium hydroxide which again dissolves the $MoO_3$ (to produce ammonium molybdate) while leaving the residual contaminants (e.g., unreacted $MoS_2$) undissolved. The undissolved contaminants are collected using a fifth filter and are thereafter discarded. The liquid filtrate from the fifth filter is mixed with the filtrate obtained from the third filter and treated by evaporation or crystallization, followed by calcination to generate purified $MoO_3$.

U.S. Pat. No. 3,714,325 to Bloom et al., involves a procedure in which molybdenite ($MoS_2$) which contains Fe and Cu impurities is combined with water to form a slurry. The slurry is then heated to about 100°–150° C. in an oxygen atmosphere at a pressure of about 200–600 psi for 30–60 minutes. After this step, the aqueous slurry is removed from the reaction vessel and filtered to separate the solid residue from the leach liquor. The residue consists primarily of $MoS_2$ (about 80–90% by weight), with the liquor containing the aforementioned metallic impurities (e.g., Cu and Fe).

In U.S. Pat. No. 4,724,128 to Cheresnowsky, et al., a method is described wherein $MoO_3$, ammonium dimolybdate, or ammonium paramolybdate is roasted to produce $MoO_2$ (molybdenum dioxide). To remove potassium contaminants from the $MoO_2$, this material is washed with water to generate a slurry. The resulting wash water which contains the potassium contaminants is then removed from the system.

U.S. Pat. No. 4,553,749 to McHugh, et al., discloses a procedure in which $MoS_2$ is converted directly to $MoO_2$ by combining the $MoS_2$ with $MoO_3$ vapor. The $MoO_3$ vapor is preferably produced by routing a portion of the previously-generated $MoO_2$ into a flash furnace where it is subjected to "flash sublimation" in order to oxidize the $MoO_2$. As a result, a supply of $MoO_3$ vapor is created which can be used to treat the initial supplies of $MoS_2$ as discussed above.

U.S. Pat. No. 3,834,894 to Spedden, et al., involves a detailed process for purifying $MoS_2$ using a diverse sequence of heating and flotation steps to yield a high-grade $MoS_2$ concentrate.

Notwithstanding the processes described above, a need remains for a highly efficient method in which a purified $MoO_3$ product is produced from $MoS_2$ which focuses on the efficiency of the high pressure wet oxidization process. In particular, a need remains for a treatment method that decreases the size of the reaction vessel (autoclave) and/or the time required for the high pressure wet oxidization process. Such a treatment method would reduce the capacity of the autoclave required and/or increase the amount of material (i.e., throughput) that can be processed by an autoclave of given capacity. Of course, such a treatment method would also result in reduced operating costs. Additional advantages could be realized if such a treatment method could achieve high yields of $MoO_3$, but without the need to use a second autoclave to recover residual unreacted $MoS_2$. All of these goals are achieved by the unique method of the present invention as discussed below which involves a specialized dual recycling process. The claimed invention produces highly efficient results (e.g., improved yields of purified $MoO_3$ from an autoclave having a given capacity), avoids undesired Mo losses, is entirely different from the other procedures discussed above, and clearly represents a significant advance in the art of molybdenum beneficiation. The benefits and advantages of the claimed invention shall become readily apparent from the specific description of the invention provided below.

SUMMARY OF THE INVENTION

It is an object of the present invention to provide a highly effective method for producing a purified supply of molybdenum trioxide ($MoO_3$) from the oxidization of an initial supply of molybdenum sulfide ($MoS_2$).

It is another object of the invention to provide a method for producing a purified supply of $MoO_3$ from the oxidization of $MoS_2$ that is characterized by maximum conversion of $MoS_2$ to $MoO_3$ with a minimal number of process steps.

It is another object of the invention to provide a method for producing a purified supply of $MoO_3$ from the oxidation of $MoS_2$ which also facilitates the conversion of residual (e.g., unreacted) $MoS_2$ into $MoO_3$ so that maximum yields of purified $MoO_3$ can be obtained.

It is another object of the invention to provide a method for producing a purified supply of $MoO_3$ from the oxidation of $MoS_2$ which also minimizes the amount of Mo lost to the process liquor.

It is another object of the invention to provide a method for producing a purified supply of $MoO_3$ from the oxidation of $MoS_2$ which reduces the size and capacity requirements of a reaction vessel used in the high pressure wet oxidization process.

It is another object of the invention to provide a method for producing a purified supply of $MoO_3$ from the oxidation of $MoS_2$ which eliminates the need for two or more separate reaction vessels to convert residual unreacted $MoS_2$ to $MoO_3$.

It is an even further object of the invention to provide a method for producing a purified supply of $MoO_3$ in which the above-described goals are accomplished through the use of a unique, dual recycling process which employs a series of specific operating parameters which cooperate to achieve highly effective results.

In accordance with the foregoing objects, the present invention involves a unique and highly efficient method for obtaining a supply of purified molybdenum trioxide ($MoO_3$) from an initial supply of molybdenum sulfide ($MoS_2$). The purified $MoO_3$ product which is generated in accordance with the claimed process may thereafter be used as a precursor compound in the production of a wide variety of molybdenum compositions ranging from molybdenum-containing catalysts to elemental molybdenum. The claimed invention provides a variety of benefits and is characterized by a unique sequence of process steps which clearly differentiates it from prior oxidization and purification methods.

These benefits will become readily apparent from the following brief Summary of the Invention. More detailed information concerning the claimed process will be presented below in the Detailed Description of Preferred Embodiments section.

In the initial stages of the reaction process, a supply of molybdenum sulfide ($MoS_2$) is first provided. The initial supply of $MoS_2$ is typically derived from molybdenite ore which is available from numerous mine sites throughout the world in various grades including "primary" and "secondary" ore products. After processing the ore in a conventional manner (discussed further below) to separate the $MoS_2$ from the associated gangue (e.g., which normally comprises a variety of silica-containing granite materials), the resulting initial supply of $MoS_2$ is thereafter oxidized in accordance with the unique, dual recycling process of the claimed invention.

In the claimed invention, the initial supply of $MoS_2$ is combined with a suitable reagent (e.g., $H_2O$), as well as with first and second recycle streams from downstream processing. The resulting mixture is then fed into the interior region of a reaction vessel or autoclave as an aqueous slurry. The first recycle stream comprises a $MoS_2$ flotation concentrate, whereas the second recycle stream comprises a Mo bearing strip solution from a solvent extraction circuit. The reaction vessel or autoclave may include a heater and one or more mixing motors connected to corresponding mechanical agitators. The autoclave may also include one or more sparger-type agitators through which a free oxygen-containing gas from a supply is admitted under pressure into the autoclave in the form of a stream of bubbles. The provision of free oxygen can be accomplished by introducing oxygen gas from a suitable supply. Alternatively, the free oxygen can be provided by air or by a mixture of air and oxygen gas.

In the autoclave, the aqueous slurry is heated to a temperature in the range of about 175°–225° C., at which time oxygen is sparged into the slurry at an overpressure in the range of about 50–300 psig. The resulting exothermic reaction forms $MoO_3$ and $H_2SO_4$. In addition, other sulfide minerals that may be present in the feed are also reacted and solublized. The typical reaction time in a continuous feed autoclave may be in the range of about 50–75 minutes.

Significantly and in accordance with the present invention, the conversion reaction occurring in the autoclave is terminated before complete conversion of $MoS_2$ to $MoO_3$ takes place. For example, in one preferred embodiment, the conversion reaction is terminated after about 70–95% by weight of the $MoS_2$ is converted to $MoO_3$. Terminating the conversion reaction at this stage reduces the size and capacity requirements of the autoclave by about 50% compared to autoclave processes wherein the conversion reaction is allowed to be carried substantially to completion (i.e., about 97–99% by weight $MoS_2$ to $MoO_3$).

Termination of the conversion reaction may be accomplished by monitoring the amount of S contained in the cake product or by measuring the $H_2SO_4$ concentration in the liquor product. For example, the conversion reaction may be terminated when the S content in the cake product falls within the range of about 4–6% by weight S (5% by weight S preferred), based on a feed assay of 37% by weight S. In a batch process, the foregoing S content may be achieved by allowing the conversion reaction to proceed for about 50–75 minutes. In a continuous autoclave process, the feed rate can be adjusted to achieve a residence time in the autoclave to produce the desired S content, which again may correspond to a residence time in the autoclave of about 50–75 minutes.

The product slurry discharged from the autoclave is thereafter separated into a solid $MoO_3$ cake product and a liquor product. The cake product typically contains from about 30–50% by weight $H_2O$. The liquor typically contains from about 7–12% by weight $H_2SO_4$, about 0.5–2.0% by weight Mo, and nearly all the contaminants present in the $MoS_2$ feed.

After the cake product is separated from the liquor product, the cake product is re-pulped (if required) and fed into a hydrocyclone to separate the unreacted $MoS_2$ from the $MoO_3$. The hydrocyclone accomplishes a physical separation, producing an underflow product and an overflow product. The hydrocyclone underflow product consists of about 85% or more by weight of the $MoS_2$ and less than about 40% by weight $MoO_3$. The overflow product consists of less than about 15% by weight $MoS_2$ and more than about 60% by weight of the $MoO_3$. Thereafter, the cyclone underflow product is diluted as necessary with a suitable diluent and the resulting suspension is advanced to a froth flotation step. The cyclone overflow product is advanced to a solid/liquid separation step.

The froth flotation step separates the cyclone underflow product into a float product and a sink product. The float product typically contains from about 30–50% by weight $MoS_2$ with the remainder consisting primarily of $MoO_3$. The sink product typically consists primarily of $MoO_3$ with only about 2–5% by weight $MoS_2$. The sink product is combined with the cyclone overflow product for further processing.

The combined cyclone overflow and sink products are dewatered in a solid/liquid separation step to produce a solid product and a liquor. The solid product typically contains from about 1.5–4% by weight $MoS_2$ with the remainder consisting essentially of $MoO_3$ product. The liquor typically contains some $H_2SO_4$, as well as dissolved Mo, Fe, Cu, and Re. The solid product is advanced to a drying stage. The liquor is combined with the product slurry discharged from the autoclave. After the liquor product has been separated from the cake product, the liquor product advanced to a solvent extraction stage.

The solvent extraction stage is used to separate the dissolved Mo and Re from the liquor product. In this process, the liquor product containing the dissolved metals of interest (e.g., Mo and Re) is contacted with an organic extractant that selectively exchanges the metal ions of interest (e.g., the Mo and Re ions) for ions that are not of interest (e.g., $OH^-$). The metals of interest are then stripped from the organic extractant using an appropriate strip solution (e.g., a basic solution containing either NaOH, $NH_4OH$, or $NaCO_3$), where the Mo and Re ions are exchanged for $OH^-$ ions. The Re may then be separated from the strip solution and recovered by a separate Re processing circuit. The Mo is recirculated back to the autoclave as the second recycle stream. The recycling of the Mo strip solution minimizes the Mo losses to the liquor stream, thus maximizing Mo recovery.

The solid product from the second solid/liquid separation stage is dried by a dryer to form a dried product. The dried product is then calcined to remove residual S that is present either as $MoS_2$ or as metal sulfates and $H_2SO_4$. Calcining removes the last 1.5–4% by weight of the unreacted $MoS_2$ that is contained in the dried product. The target S assay in the final product is less than about 0.10% by weight, which is the specification for technical grade molybdic oxide.

As discussed in substantial detail below, the present invention and the unique dual recycling process associated therewith enables the efficient production of a purified $MoO_3$ product. The purified $MoO_3$ product can be stored or used in a number of conventional processes as a starting material in order to produce many different molybdenum materials ranging from complex catalysts to purified molybdenum metal. The present invention represents a substantial advance in molybdenum processing and provides many benefits over previously known methods. In particular, recirculating unreacted $MoS_2$ and Mo back to the autoclave feed results in an overall conversion of 97–99% by weight of the $MoS_2$ in the feed to $MoO_3$. This conversion is completed in about 50% of the time compared with a conventional autoclave process wherein it is attempted to convert 97–99% by weight of the $MoS_2$ in a single pass through the autoclave. The dual recycling process in accordance with the present invention significantly reduces the size and capacity requirements (e.g., by about 50%) associated with the reaction vessel (autoclave), thereby substantially increasing the overall operating efficiency of the entire production system. The present invention likewise provides the following specific benefits: (1) the ability to achieve high conversion of $MoS_2$ to $MoO_3$ in a fraction of the time required by conventional high pressure oxidization processes; (2) an increase in the overall processing capacity (throughput) of a given autoclave, and/or the reduction in the size and capacity of the autoclave needed to achieve high yields of the desired final product; and (3) a high level of operational efficiency which enables large amounts of purified $MoO_3$ to be generated in a minimal amount of time using reduced levels of labor and materials.

These and other objects, features, and advantages of the claimed invention shall be further discussed in the Brief Description of the Drawings and Detailed Description of Preferred Embodiments sections provided below.

BRIEF DESCRIPTION OF THE DRAWINGS

Illustrative and presently preferred embodiments of the invention are shown in the accompanying drawings in which.

DETAILED DESCRIPTION OF THE INVENTION

Figure 1:
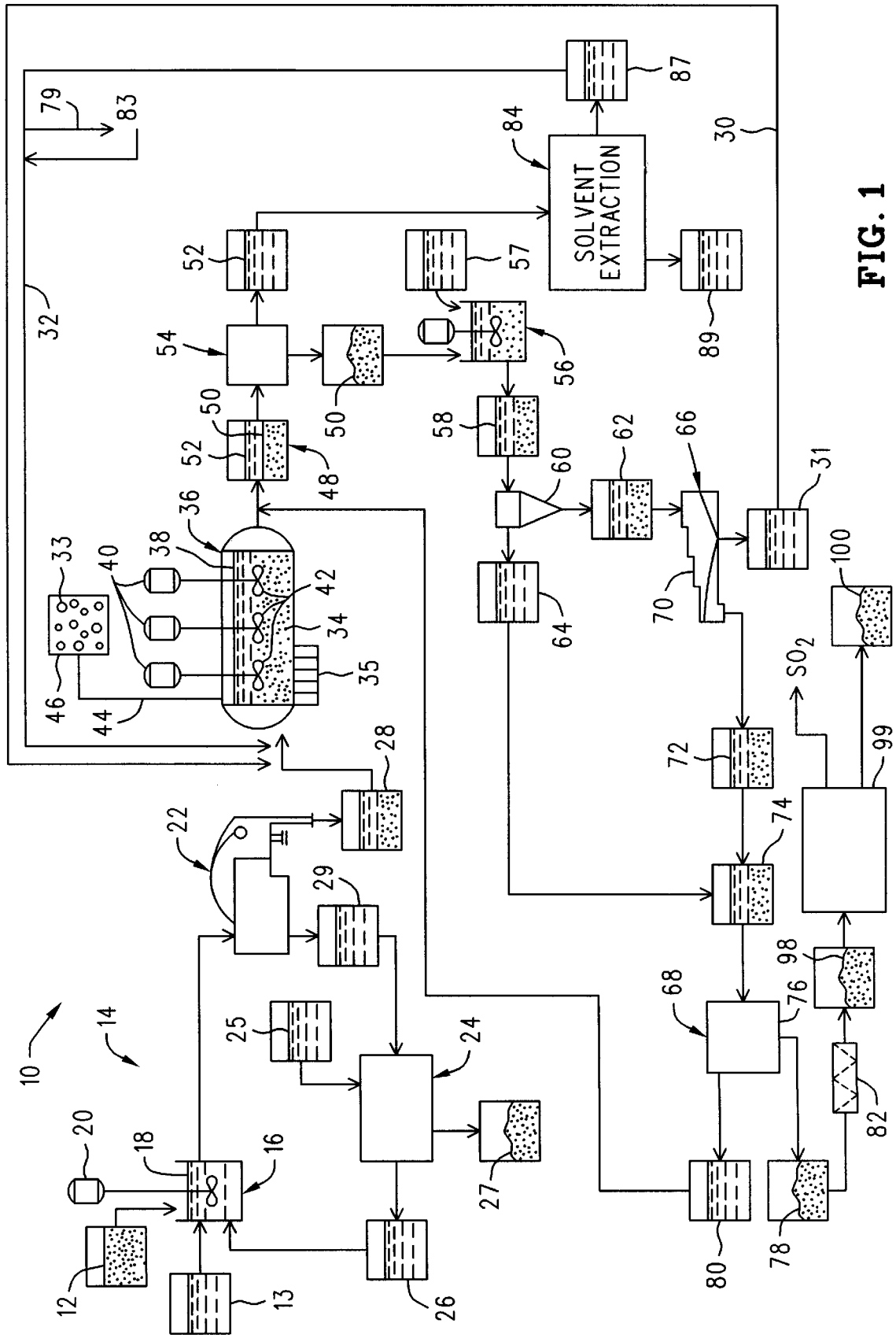
FIG. 1 is a schematic representation of the process steps used in a preferred embodiment of the present invention to generate a supply of molybdenum trioxide ($MoO_3$) from molybdenum sulfide ($MoS_2$)

As noted above, the present invention involves a unique series of steps which are used to oxidize molybdenum sulfide ($MoS_2$) to form molybdenum trioxide ($MoO_3$). In particular, the claimed invention involves a dual recycling process which substantially reduces the size and capacity of the reaction vessel (e.g., autoclave) required for the high pressure wet oxidization process, thereby reducing costs and/or increasing material throughput.

Briefly, the method 10 for autoclaving molybdenum disulfide ($MoS_2$) according to one preferred embodiment of the invention involves the step of providing an initial supply 28 of $MoS_2$. The initial supply 28 of $MoS_2$ is combined with various chemical reagents, e.g., $H_2O$ and $O_2$ (by way of an $O_2$-containing atmosphere), and heated in a suitable reaction chamber, such as an autoclave 36. As a result, the $MoS_2$ is converted to molybdenum oxide (e.g., primarily $MoO_3$) and sulfuric acid ($H_2SO_4$). Significantly, the conversion reaction is terminated before completion, i.e., before all (or substantially all) of the $MoS_2$ has been converted to $MoO_3$ and $H_2SO_4$. In one preferred embodiment of the invention, the conversion reaction is terminated when about 70–95% by weight of the $MoS_2$ has been converted into $MoO_3$ and $H_2SO_4$.

Next, the autoclave discharge slurry 48 is separated into a solid reaction product or cake 50 and a liquor product 52. The cake 50 consists primarily of $MoO_3$, along with some residual unreacted $MoS_2$. The cake 50 is thereafter processed in a hydrocyclone 60 and flotation cell system 66 to separate the desired $MoO_3$ product from the unreacted $MoS_2$. The isolated $MoO_3$ product 74 is thereafter separated into a cake product 78 and a liquor product 80. The cake product 78 is collected and further treated in a conventional manner to produce purified $MoO_3$ product 100. The unreacted $MoS_2$ 31 is then recycled back to the autoclave 36 as recycle stream 30, whereupon it is combined with the autoclave feed 28. Consequently, this previously unreacted $MoS_2$ is converted to $MoO_3$ in the autoclave 36.

The remaining liquid fraction (i.e., liquor 52) from the autoclave discharge slurry 48 (which contains substantial amounts of dissolved Mo, Re, and Cu, as well as $H_2SO_4$) is then subjected to a solvent extraction process 84. Specifically, the liquor product 52 is mixed with a selected solvent or solvents to produce a raffinate product 89 containing $H_2SO_4$ and Cu, and a strip solution 87 containing dissolved Mo and Re. The strip solution 87 is then recycled back to the autoclave 36 as recycle stream 32, thus allowing the Mo in the strip solution 87 to be oxidized and recovered as $MoO_3$. Alternatively, an ion exchange circuit could be used to separate the Mo from the liquor product 52.

A significant advantage associated with the present invention 10 is that it substantially reduces the size and capacity requirements (e.g., by about 50%) associated with the reaction vessel (e.g., autoclave 36), thereby increasing the overall operating efficiency of the entire production system and reducing costs. Still other advantages associated with the present invention include: (1) the ability to achieve high conversion of $MoS_2$ to $MoO_3$ in a fraction of the time required by conventional high pressure oxidization processes; (2) an increase in the overall processing capacity (throughput) of a given autoclave, and/or the reduction in the size and capacity of the autoclave needed to achieve high yields of the desired final product; and (3) a high level of operational efficiency which enables large amounts of purified $MoO_3$ to be generated in a minimal amount of time using reduced levels of labor and materials. Accordingly, the unique dual recycling process of the present invention substantially departs from prior oxidation and purification methods and represents a significant advance in the field of molybdenum refining as previously noted.

Having briefly described the process 10 according to the present invention, as well as some of its more significant features and advantages, the method for autoclaving molybdenum disulfide according to the present invention will now be described in detail.

With reference to FIG. 1, a schematic illustration of the process steps and procedures used to generate a purified $MoO_3$ product from $MoS_2$ starting materials is provided. At the outset, it is important to emphasize that the present invention shall not be limited to any specific hardware and processing equipment, with many different types of operating components being suitable for use in the claimed process. As illustrated in FIG. 1, the basic method, which is generally designated at reference number 10, initially involves the step of providing a supply of molybdenum sulfide ($MoS_2$) generally designated at reference number 12.

To obtain the initial MoS$_2$ starting material 12 in a preferred embodiment of the invention, this material is derived from a supply of molybdenite (MoS$_2$-containing) ore (not shown) which is available from numerous mine sites throughout the world. For example, a representative mine site from which large supplies of molybdenite ore may be obtained is the Henderson mine operated by the Cyprus Climax Metals Company at Empire, Colo. (USA). This mine site is generally characterized as a "primary" mine which is capable of producing large amounts of relatively pure product. However, of increasing interest is "by-product" molybdenite which involves a secondary product combined with copper-containing materials obtained from "nonprimary" mine sites (e.g., the Cyprus Sierrita Mine at Tucson, Ariz. (USA) and others). The present invention is capable of effectively processing both "primary" and "secondary" ore materials and should not be regarded as limited to any one type.

Once obtained, the molybdenite ore may be thereafter processed in a conventional manner to separate the desired MoS$_2$ from the surrounding waste material which is normally comprised of silicified granite and is commonly referred to as "gangue." A basic procedure for isolating the MoS$_2$ from other components of the molybdenite ore is described in U.S. Pat. No. 4,046,852 to Vertes et al., which is hereby incorporated by reference for all that it discloses. Essentially, the molybdenite ore, which may contain about 0.03–0.6% by weight MoS$_2$ in the form of black, hexagonal crystals, is first subjected to a size reduction stage using a conventional size reduction (e.g., grinding and crushing) apparatus known in the mining industry for this purpose. A representative size reduction apparatus suitable for use with the claimed process will consist of a standard impact milling system or roll crusher unit. However, other grinding and crushing systems may also be used, with the present invention not being exclusively restricted to any particular type of size reduction apparatus.

As a result of the grinding and crushing step described above, the molybdenite ore is converted into a ground ore product which is typically in particulate form having an average particle size of about 100 U.S. Tyler mesh or less. Thereafter, the ground ore product may be treated in many different ways to remove the desired MoS$_2$ therefrom. For example, the ground ore product may be introduced into a conventional flotation extraction system which employs numerous reagents including various hydrocarbon compositions, as well as selected wetting agents. Flotation extraction systems are known in the mining industry, with specific information involving a representative flotation-based extraction system for processing molybdenite ore being described in U.S. Pat. No. 4,046,852, discussed above, and U.S. Pat. No. 3,834,894 to Spedden, et al., which is also incorporated herein by reference for all that it discloses. A wide variety of different flotation chemicals may be used in connection with conventional flotation systems of the type described above including, but not limited to, butyl carbitol, allyl esters, and potassium xanthates. Typically, the "float" product associated with a representative flotation extraction system will contain the desired isolated initial supply of molybdenum sulfide 12 (MoS$_2$). The "sink" product will consist primarily of the waste gangue (not shown) which may be discarded or further processed if desired. Of course, it is common that such flotation extraction processes often utilize multiple, sequential flotation stages and may include intervening grinding steps, depending on the particular type of ore being processed and other extrinsic considerations. Consequently, the present invention should not be regarded as limited to any particular flotation extraction procedures or other processes for obtaining the initial supply of molybdenum sulfide 12, with many other conventional techniques being applicable as discussed above.

At this stage, the initial supply of molybdenum sulfide 12 is ready for further processing, and will typically have a particle size of about 200–400 U.S. Tyler mesh. The initial supply of molybdenum sulfide 12 will likely have a number of residual compositions associated therewith which originated within the ore product. Specifically, these materials are carried over into the initial supply of molybdenum sulfide 12 from the ground ore product, with the initial supply of molybdenum sulfide 12 normally containing about 0.2–22% by weight non-MoS$_2$ materials. These non-MoS$_2$ materials will typically consist of small amounts of residual gangue as well as various gangue-derived metals and metal compounds (e.g., metal oxides, chlorides, sulfides, and the like) which include, but are not limited to, the following metals: potassium, manganese, sodium, lead, tin, magnesium, calcium, iron, copper, bismuth, and aluminum. The exact amount and concentration of these materials within the initial supply of molybdenum sulfide 12 (with such materials collectively being referred to herein as "contaminants") will, of course, vary depending on the particular ore body from which the initial ore was obtained, as well as the level of preliminary treatment used to produce the initial supply of molybdenum sulfide 12. As discussed further below, these naturally-derived contaminants must be removed at some point during the molybdenum purification process in order to prevent undesired contamination of the final molybdenum products generated from the purified molybdenum trioxide (MoO$_3$) to be produced in accordance with this invention.

In accordance with the foregoing considerations, the initial supply of molybdenum sulfide 12 may by subjected to an optional hydrometallurgical upgrade step (designated generally at reference number 14). This optional step 14 involves leaching of the initial supply of molybdenum sulfide 12 with a selected reagent or reagents 13 (e.g., HCl) to "upgrade," i.e., preliminarily remove, various contaminant materials from the initial supply of molybdenum sulfide 12, such as extraneous lead, if the initial supply of molybdenum sulfide 12 is heavily contaminated.

A representative hydrometallurgical upgrade step 14 may include the step of combining the initial supply of molybdenum sulfide 12 with the selected reagent 13 (e.g., HCl) in a vessel 16 to form a slurry 18. The vessel 16 may be provided with a stirrer 20 to ensure a thorough dispersal of the solids in the slurry 18. The slurry 18 may then be filtered by a suitable filter 22 to produce an upgraded initial supply of molybdenum sulfide (MoS$_2$) 28 and a filtrate 29 containing the contaminants (e.g., lead) solublized by the reagent 13. The filtrate 29 may then be directed to a precipitate tank 24 for separation of the contaminants. A suitable reagent 25, such as H$_2$SO$_4$, may be added to the filtrate 29 contained in tank 24 to facilitate the precipitation of the contaminants (such as, for example, by the formation of PbSO$_4$). The resulting precipitate 27 (e.g., PbSO$_4$) can then be discarded. The leach liquor 26 may be recycled to the leach vessel 16. Again, it should be emphasized that this hydrometallurgical upgrade step 14 is optional and a decision to use it will be undertaken in accordance with preliminary assays of the materials being processed.

The upgraded initial supply of molybdenum sulfide 28 (i.e., feed) from the filter 22 comprises an aqueous slurry comprising water and MoS$_2$. This feed 28 typically assays 36–40% S, but may vary depending on the purity of the initial supply of molybdenum sulfide and the amount of contaminants. The initial supply of molybdenum sulfide 28 is ultimately combined with recycle streams 30 and 32 from downstream processing stages (discussed below) and is fed into the interior region 34 of a reaction vessel or autoclave 36 as an aqueous slurry 38. The slurry density of the feed 28 should be adjusted as necessary to have a slurry density of about 5–20% by weight solids. As will be described in greater detail below, the recycle stream 30 comprises a $MoS_2$ flotation concentrate 31, whereas the recycle stream 32 comprises a Mo bearing strip solution 87 from a solvent extraction circuit 84. The reaction vessel or autoclave 36 may be operated in either a batch mode or a continuous mode, as will be discussed further below.

The reaction vessel or autoclave 36 may include a heater 35 and one or more mixing motors 40 having corresponding blades or agitators 42. The autoclave 36 may also include one or more sparger-type agitators (not shown) through which a free oxygen-containing gas 33 from a supply 46 is admitted under pressure into the autoclave 36 in the form of a stream of bubbles (not shown). Since mechanical and sparger-type agitators are well-known in the art, the particular mechanical and sparger-type agitators utilized in one preferred embodiment of the autoclave 36 will not be described in further detail.

The combination of mechanical and sparger-type agitators has been found satisfactory for providing a degree of agitation sufficient to effect the continued dispersion of the molybdenum sulfide particles and also to effect an entrainment of minute bubbles of free oxygen ($O_2$) in the aqueous slurry 38 for reaction on the surfaces of the molybdenum sulfide particles. The agitation of the slurry 38 also promotes a mechanical scrubbing of the particle surfaces for removing the film of molybdenum oxide formed thereon, thereby exposing fresh molybdenum sulfide for further reaction with free oxygen.

The provision of free oxygen in the autoclave 36 can be accomplished by introducing oxygen gas 33 from a suitable oxygen supply 46 through a supply line 44. Alternatively, the free oxygen can be provided by air or by a mixture of air and oxygen gas.

In the autoclave 36, the aqueous slurry 38 is heated (e.g., by heater 35) to a temperature in the range of about 175°–225° C., at which time oxygen is sparged into the slurry 38 at an overpressure in the range of about 50–300 pounds per square inch gauge (psig). The resulting exothermic conversion reaction forms $MoO_3$ and $H_2SO_4$. In addition, other sulfide minerals (including chalcopyrite and pyrite) that may be present in the feed 28 are also reacted and solublized. By way of example, three common principle chemical reactions for $MoS_2$, $CuFeS_2$, and FeS are as follows:

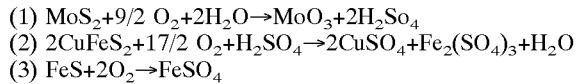

(1) $MoS_2 + 9/2\ O_2 + 2H_2O \rightarrow MoO_3 + 2H_2SO_4$
(2) $2CuFeS_2 + 17/2\ O_2 + H_2SO_4 \rightarrow 2CuSO_4 + Fe_2(SO_4)_3 + H_2O$
(3) $FeS + 2O_2 \rightarrow FeSO_4$ Since the foregoing reactions are exothermic, they are generally self-sustaining once the slurry 38 has been heated to the appropriate starting temperature (e.g., 175°–225° C.). Thereafter, cooling water (not shown) may be added to the autoclave 36 as required to control the temperature of the slurry 38 in the ranges specified above.

Significantly and in accordance with the present invention, the conversion reaction, i.e., the oxidation of $MoS_2$ to $MoO_3$ and $H_2SO_4$, is terminated before complete conversion of $MoS_2$ to $MoO_3$ takes place. The premature termination of the conversion reaction substantially reduces the size of the reaction vessel or autoclave 36 compared to that required if the conversion reaction is carried out to completion. For example, in one preferred embodiment, the reaction is terminated when only about 70–95% by weight of the $MoS_2$ is converted into $MoO_3$ and $H_2SO_4$. Terminating the conversion reaction at this stage reduces the size and capacity requirements of the autoclave 36 by about 50% compared to autoclave processes wherein the conversion reaction is allowed to be carried out substantially to completion (i.e., when about 97–99% by weight of the $MoS_2$ converted into $MoO_3$). Accordingly, the present invention allows a significantly smaller autoclave to be used at a given processing site. Alternatively, a given autoclave will be capable of roughly twice the processing capacity (throughput) when used in accordance with the process of the present invention.

The product slurry 48 discharged from the autoclave 36 will typically have a sulfur content in the range of about 4–6% by weight and an $MoS_2$ content in the range of about 10–15% by weight (which corresponds to a conversion of only about 90–95% by weight of the $MoS_2$ that enters the autoclave 36). The product slurry 48 comprises a solid $MoO_3$ or cake product 50 and a liquor product 52 (the separation of which will be described in greater detail below). The solid or cake product 50 associated with the autoclave product slurry 48 typically contains from about 30–50% by weight $H_2O$. The liquor 52 associated with the autoclave product slurry 48 typically contains from about 7–12% by weight $H_2SO_4$, about 0.5–2.0% by weight of the Mo in the autoclave feed 28 and nearly all of the contaminants (e.g., Cu, Fe, and Re) present in the $MoS_2$ feed 28.

The conversion reaction can be terminated at the appropriate time by monitoring the S content in the solid product 50 or by measuring the $H_2SO_4$ concentration in the autoclave discharge liquor 52. By way of example, the S content may be determined with a Leco sulfur analyzer and the sulfuric acid concentration may be determined by titration. Alternatively, x-ray analysis methods can be used to distinguish between $MoS_2$ and $MoO_3$, thus determine when 70–95% by weight of the $MoS_2$ has been converted to $MoO_3$. For example, if the sulfur content is monitored, the conversion reaction should be terminated when the S content falls to about 4–6% by weight S (5% by weight S preferred) for a feed assay of about 37% by weight S. In a batch operation, the time required to achieve such a sulfur content (e.g., 4–6% by weight S, which corresponds to about 70–95% conversion for a feed assay of about 37%) will typically be in the range of 50–75 minutes. In a continuous autoclave process, the feed rate can be adjusted to result in a residence time of about 50–75 minutes, which again would result in the conversion of about 70–95% by weight of the $MoS_2$ that is fed into the autoclave 36. However, it should be remembered that the conversion times stated above are examples only. The actual conversion times associated with a given installation may vary and will, of course, be determined in accordance with the time required to convert about 70–95% by weight $MoS_2$ to $MoO_3$, as described above.

After the conversion reaction is terminated, the autoclave slurry product 48 is thereafter processed to separate the solid $MoO_3$ cake product 50 from the liquor product 52. The separation may be accomplished by any of a variety of processes, including, but not limited to, pressure filtration, vacuum filtration, or centrifuging. Separation of the solid $MoO_3$ product or cake 50 from the liquor 52 serves two purposes. First, the contaminant laden liquor 52 is removed from the solid product or cake 50. Second, the liquor 52, which includes significant recoverable amounts of Mo, can then be cleaned of suspended solids so that the dissolved Mo (and Re, if present) can be stripped out by the solvent extraction circuit 84 and recirculated to the autoclave 36 as recycle stream 32.

It is preferred, but not required, that the separation of the solid or cake product 50 from the liquor 52 be accomplished in a solid bowl centrifuge 54. While both vacuum and pressure filtration processes are technically possible, the filtration rates associated with such processes are currently so low as to make them practically and economically unsuitable for most applications. However, subsequent improvements in vacuum and pressure filtration processes, or the development of new, as yet-unknown filtration processes, may allow such other filtration processes to be used as well. Accordingly, the present invention should not be regarded as limited to separation using a solid bowl centrifuge 54.

After the autoclave slurry 48 has been separated into the cake product 50 and liquor product 52, the solid or cake product 50 is re-pulped (if necessary) in a re-pulp tank 56 by adding water 57 to the cake 50 to produce a slurry 58. Sufficient water should be added to the cake 50 so that the resulting slurry product 58 comprises from about 5–15% by weight solids. Thereafter, the slurry product 58 is fed into a hydrocyclone 60 to separate the unreacted $MoS_2$ from the $MoO_3$. The separation effected by the hydrocyclone 60 comprises a physical separation process and no reagents are employed in the hydrocycloning process.

The hydrocycloning process is moderately efficient in separating the $MoS_2$ from the $MoO_3$. For example, in one preferred embodiment, the hydrocyclone 60 effects a separation of the $MoS_2$ from the $MoO_3$ to the extent that about 85% or more by weight of the $MoS_2$ and less than about 40% by weight of the $MoO_3$ reports to the cyclone underflow product 62. Similarly, less than about 15% by weight of the $MoS_2$ and more than about 60% by weight of the $MoO_3$ reports to the cyclone overflow product 64. The cyclone underflow product 62, which contains between about 15–25% by weight $MoS_2$, is diluted as necessary with water until it consists of about 7–15% by weight solids. The resulting suspension is advanced to the froth flotation step, indicated generally at number 66, for $MoS_2$ recovery. The overflow product 64, which contains between about 0.5–1.5% by weight $MoS_2$ is advanced to the solid/liquid separation step, indicated generally at 68.

In the froth flotation step 66, the cyclone underflow product 62 is subsequently fed into one or more flotation cells 70. Suitable frothers and $MoS_2$ collectors are added as required to effect good flotation separation. By way of example, a suitable frother could comprise MIBC (i.e., methyl isobutyl carbinol), although other frothers could also be used. A suitable collector may comprise MCO (i.e., a blended oil designed for molybdenum flotation), available from Phillips 66 Company of Bartlesville, Okla. (USA). Other collectors are also available, such as No. 2 diesel fuel. Since a wide range of frothers and collectors are known and could be used in place of the frothers and collectors identified above, the present invention should not be regarded as limited to any particular frother or collector.

As mentioned above, the flotation feed (e.g., the cyclone underflow 62 after being diluted with water) consists of about 15–25% by weight $MoS_2$. Typically, 60–90% by weight of this $MoS_2$ is removed as "float" product 31 from the froth and is recycled as recycle stream 30 to the autoclave 36 for further oxidization. The "float" product 31 typically contains from about 30–50% by weight $MoS_2$ with the remainder consisting primarily of $MoO_3$. The "sink" or unfloated $MoO_3$ product 72 (which consists primarily of $MoO_3$ product with only about 2–5% by weight $MoS_2$) is combined with the overflow product 64 from the hydrocyclone 60 to form a combined product 74. Of course, the flotation process 66 may comprise multiple, sequential flotation stages depending on various extrinsic considerations.

Before proceeding with the detailed description of the present invention, it is useful to consider a few important issues regarding the hydrocycloning and froth flotation steps 60 and 66. First, while froth flotation with no prior hydrocycloning step (e.g., 60) could be used to accomplish separation of the unreacted $MoS_2$ from the $MoO_3$, the process would be very inefficient due to the relatively large quantity of very fine $MoO_3$ that is present in the solid or cake product 50. These fine particles of $MoO_3$ would result in a relatively high percentage of the $MoO_3$ being entrained in the "float" product 31, resulting in a higher than desired recirculating load (i.e., recycle stream 30). In addition, these fines would inhibit the removal of $MoS_2$ from the $MoO_3$, resulting in a greater quantity of $MoS_2$ reporting to the sink product 72. The use of the hydrocyclone separation step 60 removes a significant portion of the $MoO_3$ product prior to flotation while rejecting much of the $MoS_2$.

Similarly, use of the hydrocyclone process 60 alone would (in most cases) not be adequate. For example, cyclone underflow product 62 recycled directly into recycle stream 30 could result in a large circulating load of coarse $MoO_3$ particles which may eventually overwhelm the circuit. Subsequent flotation of the cyclone underflow 62 allows these coarse $MoO_3$ particles to be removed and advanced to the final product 100.

With the foregoing considerations in mind, it should also be noted that the present invention 10 is not limited to separation of the $MoS_2$ from the $MoO_3$ by the steps of hydrocycloning 60 and froth flotation 66. For example, it may be possible to utilize other separation methods, such as gravity separation, to separate the $MoS_2$ from the $MoO_3$, provided, of course, that such gravity separation methods avoid the problems discussed immediately above. Alternatively, chemical dissolution of the $MoO_3$ also may be possible, leaving a solid $MoS_2$ residue that can be recycled to the autoclave 36. Consequently, the present invention should not be regarded as limited to any particular separation process or combination or separation processes for separating the $MoS_2$ from the $MoO_3$ in the cake product 50, with many other conventional techniques being applicable, as discussed above.

Referring again to FIG. 1, the combined product 74, consisting of the cyclone overflow product 64 and the "sink" product 72, is dewatered by the solid/liquid separation step 68. The solid/liquid separation may be accomplished by pressure filtration, vacuum filtration, or centrifuging. In one preferred embodiment, a centrifuge 76 is used to dewater the combined product 74 to produce a solid or cake product 78 and a liquor product 80. The solid or cake product 78 typically contains from about 1.5–4% by weight $MoS_2$. The liquor product 80 typically contains some $H_2SO_4$, as well as dissolved Mo, Fe, Cu, and Re. The solid or cake product 78 is advanced to a drying stage 82, as will be described in greater detail below. The liquor product 80 is combined with the autoclave slurry product 48. Subsequently, the liquor product 52 is separated from the cake product 50 in the first solid/liquid separation stage 54. The liquor product 52 is then advanced to the solvent extraction stage 84.

The solvent extraction process 84 is used to recover the dissolved Mo and Re from the liquor product 52. Alternatively, any of a wide variety of ion exchanges processes may be used to recover the dissolved Mo and Re from the liquor product 52. In the solvent extraction process 84 utilized in one preferred embodiment of the invention, the liquor product 52, which comprises an aqueous solution containing the dissolved metals of interest (e.g., Mo and Re), is contacted with an organic extractant that selectively exchanges the metal ions of interest (e.g., the Mo and Re ions) for ions that are not of interest (e.g., OH$^-$). The metals of interest (e.g., Mo and Re) are then stripped from the organic extractant using an appropriate strip solution (e.g., a basic solution containing either NaOH, NH$_4$OH, or NaCO$_3$), where Mo and Re ions are exchanged for OH$^-$ ions. The Re may then be separated from the strip solution 87 and recovered in a separate Re processing circuit (not shown, but designated generally at number 83), while the Mo is recirculated back to the autoclave 36 as recycle stream 32. The recycling of the Mo strip solution 87 minimizes the Mo losses to the liquor stream, thus maximizing Mo recovery.

Figure 2:
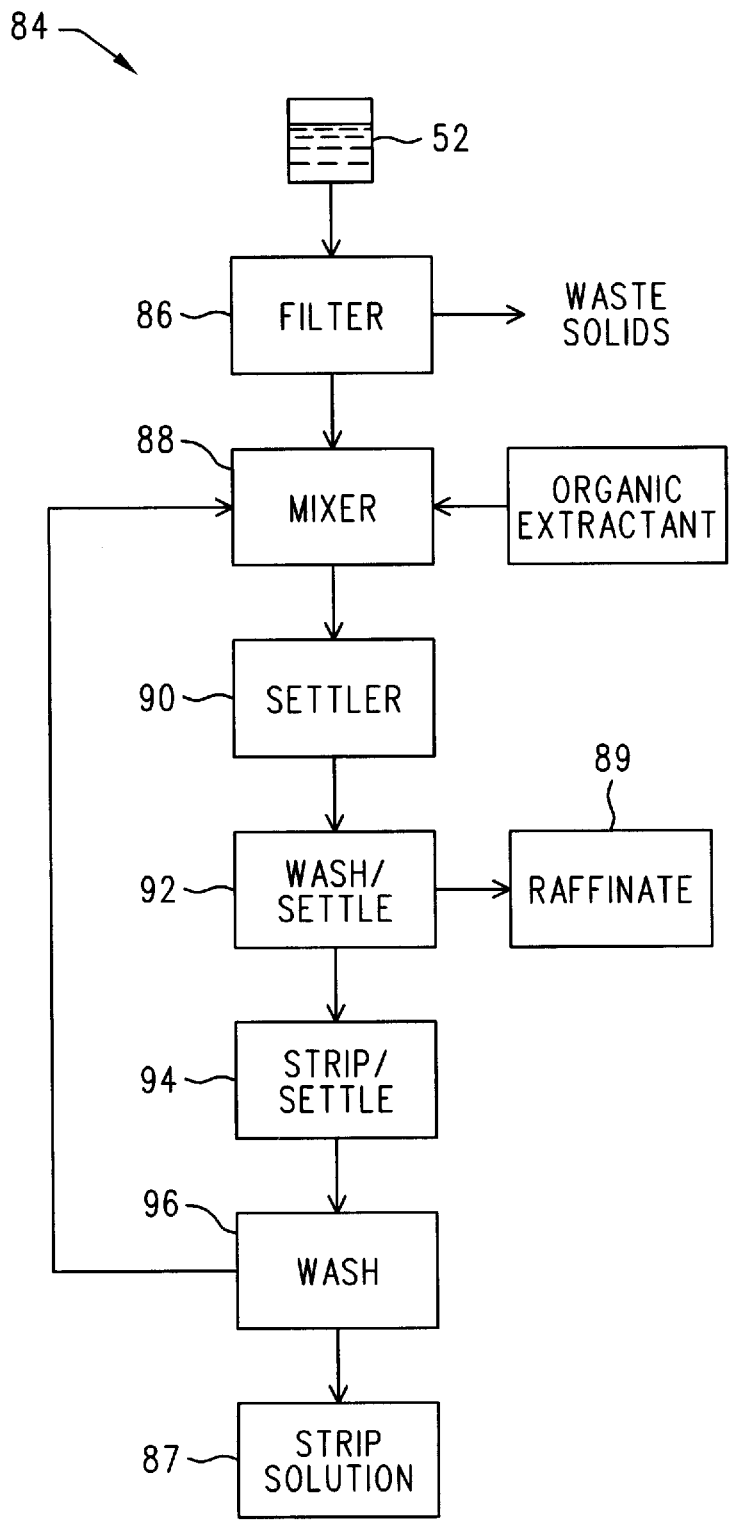
FIG. 2 is a schematic representation of the solvent exchange process shown in FIG. 1.

The details of the solvent extraction process 84 are best seen in FIG. 2. The first step in the solvent extraction process 84 is to filter the liquor 52 in a filter 86 to remove suspended solids prior to solvent extraction. This pre-filtration step prevents phase disengagement problems that can result from the presence of solids. Thereafter, the filtrate from filter 86 is combined with an organic extractant solution in a mixer 88. The organic extractant solution may comprise an amine-based extractant such as ALAMINE 336 (which consists of a tertiary amine) available from Henkel Corporation of Tucson, Ariz. (USA), combined with an equal volume of tridecanol, which is in turn diluted in a petroleum hydrocarbon distillate, such as KERMAC 400–500 solvent (a straight run kerosene). Extractant concentration in the organic diluent is typically 1% by volume extractant for each 0.2% by weight Mo in the liquor, although other concentrations may also be used. The solutions are contacted in the mixer 88 and then pass on to a settler 90 where the lower density organic floats to the surface and the higher density aqueous settles to the bottom, thus disengaging the phases. Typically, there are 2–4 countercurrent flow extraction mixer/settler stages, although a greater or lesser number of mixer/settler stages may be used depending on the capacity of the particular process, the type of ore being processed, and other extrinsic considerations. In one preferred embodiment, mixer residence times may be from about 0.5–2.0 minutes and settler residence times may be from about 5–15 minutes, although other times may be used, again depending on a wide range of extrinsic considerations. The extraction step is followed by 1–3 wash mixer/settler stages 92 (although a greater number may be used) to remove entrained acidic liquor raffinate 89 from the organic phase. The acidic liquor raffinate 89 may contain H$_2$SO$_4$ and Cu.

The wash mixer/settler stages 92 are followed by 2–4 countercurrent flow strip mixer/settler stages 94 (although a greater or lesser number may be used). These stages 94 strip the Mo and Re from the loaded organic into a basic solution. The basic solution contains either NaOH, NH$_4$OH, or NaCO$_3$, at an initial concentration in the range of about 4–5% by weight and has a pH in the range of about 8.0–10.0. Stripping is followed by 1–3 countercurrent wash stages 96 (although a greater number may be used) to remove entrained basic solution from the organic phase. The organic phase is then recycled back to the extraction stage 88. The strip solution 87 may incorporate a bleed stream 79 (FIG. 1) to stabilize the Mo concentration in solution to about 5.0–12.0% by weight. The amount of Re in the strip solution 87 may vary from about 0–1000 ppm Re, depending on the bleed stream flow rate and the amount of Re in the autoclave feed 28 (FIG. 1). Optionally, the bleed stream 79 (FIG. 1) from the solvent extraction stage 84 is fed to an additional ion exchange circuit (not shown, but indicated generally at number 83) for recovery of Re, and then recycled back to the recycle stream 32 for recovery of the dissolved Mo. By way of example, typical solution assays from the solvent extraction process 84 are as follows (given in % by weight, unless otherwise noted):

| component | raffinate (%) | strip solution (%) |
|---|---|---|
| Mo | 0.00–0.01 | 5.0–12.0 |
| Re | 0–5 ppm | 0–1000 ppm |
| Cu | 0.01–1.0 | nil |
| Fe | 0.02–1.0 | nil |
| H$_2$SO$_4$ | 5.0–15.0 | 2.0–6.0 (as SO$_4^{2-}$)* |
| pH | 0.0 | 8.0–10.0 |

*excess extractant will increase the recovery of SO$_4^{2-}$.

Referring back now to FIG. 1, the cake product 78 from the centrifuge 76 is dried using any type of conventional drying equipment 82. If the cake product 78 is excessively sticky, then it may be necessary to backmix the cake product 78 with dried product 98 to facilitate handling. Oversize material (i.e., material larger than about 8 U.S. Tyler mesh) should be deagglomerated prior to calcining to increase product uniformity and to minimize calciner retention time requirements.

The dried product 98 is calcined by a calciner 99 to remove residual S that is present either as MoS$_2$ or as metal sulfates and H$_2$SO$_4$. Calcining removes the last 1.5–4% by weight of the unreacted MoS$_2$ that is contained in the dried product 98. The target S assay in the final product 100 is less than about 0.10% by weight, which is the specification for technical grade molybdic oxide. Accordingly, calcining may be performed in any equipment that can heat the dried product 98 to about 600° C. with sufficient air supplied to provide stoichiometric O$_2$ requirements. The principal reactions are as follows:

(4) $MoS_2 + 3O_2 \rightarrow MoO_2 + 2SO_2$
(5) $MoO_2 + \frac{1}{2}O_2 \rightarrow MoO_3$ In addition, metal sulfates and H$_2$SO$_4$ that are present will decompose, forming their respective oxides and SO$_2$ gas.

Thereafter, the purified MoO$_3$ product 100 can be stored or used in a number of conventional processes as a starting material in order to produce many different molybdenum materials ranging from complex catalysts to purified molybdenum metal. In this regard, the claimed process shall not be restricted to any ultimate use for the final MoO$_3$ product 100.

The present invention represents a substantial advance in molybdenum processing and provides many benefits over previously known methods. In particular, recirculating unreacted MoS$_2$ back to the autoclave feed results in an overall conversion of 97–99% by weight of the MoS$_2$ in the feed to MoO$_3$. This conversion is completed in about 50% of the time compared with a conventional autoclave process wherein it is attempted to convert 97–99% by weight of the MoS$_2$ in a single pass through the autoclave. The dual recycling process in accordance with the present invention significantly reduces the size and capacity requirements (e.g., by about 50%) associated with the reaction vessel (autoclave), thereby substantially increasing the overall operating efficiency of the entire production system. The present invention likewise provides the following specific benefits: (1) the ability to achieve high conversion of MoS$_2$ to MoO$_3$ in a fraction of the time required by conventional high pressure oxidization processes; (2) an increase in the overall processing capacity (throughput) of a given autoclave, and/or the reduction in the size and capacity of the autoclave needed to achieve high yields of the desired final product; and (3) a high level of operational efficiency which enables large amounts of purified $MoO_3$ to be generated in a minimal amount of time using reduced levels of labor and materials. Accordingly, the unique dual recycling process of the present invention substantially departs from prior oxidation and purification methods and represents a significant advance in the field of molybdenum refining as previously noted.

Having herein set forth preferred and optimum embodiments of the present invention, it is anticipated that suitable modifications can be made thereto by individuals having ordinary skill in the art which nonetheless remain within the scope of the invention. For example, the specific equipment being employed and the manner in which the various operating conditions are achieved may be varied within the scope of the invention. Accordingly, the present invention shall not be restricted to any particular operating components, and shall only be construed in connection with the following claims:

What is claimed is:

1. A method for producing $MoO_3$ from $MoS_2$ comprising the steps of:
   providing a supply of $MoS_2$;
   combining said $MoS_2$ with $H_2O$ to form a slurry;
   combining said slurry with at least one oxygen-containing oxidizing gas in order to initiate oxidization and conversion of said $MoS_2$ into $MoO_3$;
   terminating said oxidation and conversion of said $MoS_2$ into $MoO_3$ before complete conversion of said $MoS_2$ to said $MoO_3$ takes place in order to generate a solid reaction product comprising said $MoO_3$ and unreacted $MoS_2$ in combination with a residual liquid product comprising dissolved Mo therein;
   separating said solid reaction product from said residual liquid product;
   combining said residual liquid product with at least one extractant in order to generate a first liquid fraction and a second liquid fraction, said second liquid fraction comprising said dissolved Mo and said extractant;
   transferring said second liquid fraction containing said dissolved Mo back to said reaction chamber so that said dissolved Mo is combined with incoming additional supplies of $MoS_2$ for subsequent conversion into additional amounts of $MoO_3$;
   removing said unreacted $MoS_2$ from said solid reaction product; and
   transferring said unreacted $MoS_2$ back to said reaction chamber for combination with said incoming additional supplies of $MoS_2$ for subsequent conversion into said additional amounts of $MoO_3$.

2. The method of claim 1, wherein said oxidization and conversion of said $MoS_2$ into $MoO_3$ is terminated when about 70–95% by weight $MoS_2$ has been oxidized and converted into $MoO_3$.

3. The method of claim 1, further comprising the step of maintaining said oxygen-containing gas at a pressure level in the range of about 50–300 psig during said oxidization and conversion of said $MoS_2$ into $MoO_3$.

4. The method of claim 1, wherein said oxidization and conversion of $MoS_2$ into $MoO_3$ takes place at a temperature in the range of about 175°–225° C.

5. The method of claim 1, wherein said oxidization and conversion of $MoS_2$ into $MoO_3$ takes place over a time period of about 50–75 minutes.

6. The method of claim 1, wherein said oxygen-containing gas is selected from the group consisting of $O_{2(g)}$, air, and mixtures thereof.

7. The method of claim 1, wherein the step of combining said slurry with at least one oxygen containing oxidizing gas includes the step of heating said slurry to a temperature sufficient to initiate oxidization and conversion of said $MoS_2$ into $MoO_3$.

8. The method of claim 1, wherein said slurry has a slurry density of about 5–20% by weight solids.

9. A method for producing $MoO_3$ from $MoS_2$ comprising the steps of: providing a supply of $MoS_2$;
   combining said $MoS_2$ with $H_2O$ to form a slurry;
   combining said slurry with at least one oxygen-containing oxidizing gas in order to initiate oxidization and conversion of said $MoS_2$ into $MoO_3$;
   terminating said oxidation and conversion of said $MoS_2$ into $MoO_3$ before complete conversion of said $MoS_2$ to said $MoO_3$ takes place in order to generate a solid reaction product comprising said $MoO_3$ and unreacted $MoS_2$ in combination with a residual liquid product comprising dissolved Mo therein;
   separating said solid reaction product from said residual liquid product;
   combining said residual liquid product with at least one extractant in order to generate a first liquid fraction and a second liquid fraction, said second liquid fraction comprising said dissolved Mo and said extractant; and
   transferring said second liquid fraction containing said dissolved Mo back to said reaction chamber so that said dissolved Mo is combined with incoming additional supplies of $MoS_2$ for subsequent conversion into additional amounts of $MoO_3$.

10. The method of claim 9, wherein said oxidization and conversion of said $MoS_2$ into $MoO_3$ is terminated when about 70–95% by weight $MoS_2$ has been oxidized and converted into $MoO_3$.

11. The method of claim 9, further comprising the step of maintaining said oxygen-containing gas at a pressure level in the range of about 50–300 psig during said oxidization and conversion of said $MoS_2$ into $MoO_3$.

12. The method of claim 9, wherein said oxidization and conversion of $MoS_2$ into $MoO_3$ takes place at a temperature in the range of about 175°–225° C.

13. The method of claim 9, wherein said oxidization and conversion of $MoS_2$ into $MoO_3$ takes place over a time period of about 50–75 minutes.

14. The method of claim 9, wherein said oxygen-containing gas is selected from the group consisting of $O_{2(g)}$, air, and mixtures thereof.

15. The method of claim 9, wherein the step of combining said slurry with at least one oxygen containing oxidizing gas includes the step of heating said slurry to a temperature sufficient to initiate oxidization and conversion of said $MoS_2$ into $MoO_3$.

16. The method of claim 9, wherein said slurry has a slurry density of about 5–20% by weight solids.

17. A method for producing $MoO_3$ from $MoS_2$ comprising the steps of:
   providing a supply of $MoS_2$;
   combining said $MoS_2$ with $H_2O$ to form a slurry;
   combining said slurry with at least one oxygen-containing oxidizing gas in order to initiate oxidization and conversion of said $MoS_2$ into $MoO_3$;
   terminating said oxidation and conversion of said $MoS_2$ into $MoO_3$ before complete conversion of said $MoS_2$ to said $MoO_3$ takes place in order to generate a solid reaction product comprising said $MoO_3$ and unreacted $MoS_2$ in combination with a residual liquid product comprising dissolved Mo therein;

separating said solid reaction product from said residual liquid product;

removing said unreacted $MoS_2$ from said solid reaction product; and transferring said unreacted $MoS_2$ back to said reaction chamber for combination with said incoming additional supplies of $MoS_2$ for subsequent conversion into said additional amounts of $MoO_3$.

18. The method of claim 17, wherein said oxidization and conversion of said $MoS_2$ into $MoO_3$ is terminated when about 70–95% by weight $MoS_2$ has been oxidized and converted into $MoO_3$.

19. The method of claim 17, further comprising the step of maintaining said oxygen-containing gas at a pressure level in the range of about 50–300 psig during said oxidization and conversion of said $MoS_2$ into $MoO_3$.

20. The method of claim 17, wherein said oxidization and conversion of $MoS_2$ into $MoO_3$ takes place at a temperature in the range of about 175°–225° C.

21. The method of claim 17, wherein said oxidization and conversion of $MoS_2$ into $MoO_3$ takes place over a time period of about 50–75 minutes.

22. The method of claim 17, wherein said oxygen-containing gas is selected from the group consisting of $O_{2(g)}$, air, and mixtures thereof.

23. The method of claim 17, wherein the step of combining said slurry with at least one oxygen containing oxidizing gas includes the step of heating said slurry to a temperature sufficient to initiate oxidization and conversion of said $MoS_2$ into $MoO_3$.

24. The method of claim 17, wherein said slurry has a slurry density of about 5–20% by weight solids.

25. A method for producing $MoO_3$ from $MoS_2$ comprising the steps of:

providing a supply of $MoS_2$;

combining said $MoS_2$ with $H_2O$ to form a slurry having a slurry density of about 5–20% by weight solids;

heating said slurry to a temperature in the range of about 175°–225° C. for a time period in the range of about 50–75 minutes in an atmosphere comprising at least one oxygen-containing oxidizing gas selected from the group consisting of $O_{2(g)}$, air, and mixtures thereof which is maintained at a pressure in the range of about 50–300 psig in order to initiate said oxidization and conversion of said $MoS_2$ into $MoO_3$;

terminating said oxidation and conversion of said $MoS_2$ into $MoO_3$ when about 70–95% by weight $MoS_2$ has been oxidized and converted into $MoO_3$ in order to generate a solid reaction product comprising said $MoO_3$ and unreacted $MoS_2$ in combination with a residual liquid product comprising dissolved Mo therein;

separating said solid reaction product from said residual liquid product;

combining said residual liquid product with at least one extractant in order to generate a first liquid fraction and a second liquid fraction, said second liquid fraction comprising said dissolved Mo and said extractant;

transferring said second liquid fraction containing said dissolved Mo back to said reaction chamber so that said dissolved Mo is combined with incoming additional supplies of $MoS_2$ for subsequent conversion into additional amounts of $MoO_3$;

removing said unreacted $MoS_2$ from said solid reaction product; and transferring said unreacted $MoS_2$ back to said reaction chamber for combination with said incoming additional supplies of $MoS_2$ for subsequent conversion into said additional amounts of $MoO_3$.

* * * * *